US005580415A

United States Patent [19]
Diekwisch

[11] Patent Number: 5,580,415
[45] Date of Patent: *Dec. 3, 1996

[54] MEMBRANE PRESS WORK BASE

[76] Inventor: Hartmut Diekwisch, Im Groben Siek 85, 32052 Herford, Germany

[*] Notice: The term of this patent shall not extend beyond the expiration date of Pat. No. 5,529,658.

[21] Appl. No.: 448,068

[22] Filed: May 23, 1995

Related U.S. Application Data

[63] Continuation-in-part of Ser. No. 229,976, Apr. 19, 1994, Pat. No. 5,522,478.

[51] Int. Cl.$^6$ .............................. B29C 51/00; B30B 5/02
[52] U.S. Cl. .................. 156/382; 156/475; 156/583.3; 100/211; 100/299; 269/20; 269/58; 269/21
[58] Field of Search ......................... 156/285, 286, 156/382, 475, 583.3, 212, 360; 187/273, 274; 269/27, 21, 58, 309, 20; 100/211, 299

[56] References Cited

U.S. PATENT DOCUMENTS

| 4,314,814 | 2/1982 | Derode | 156/583.3 |
| 4,447,282 | 5/1984 | Valerio et al. | 156/583.3 |
| 5,225,027 | 6/1993 | Diekwisch | 156/382 |
| 5,346,193 | 9/1994 | Kitagawa | 269/21 |
| 5,397,214 | 3/1995 | Cheung | 187/274 |

FOREIGN PATENT DOCUMENTS 2-139147  5/1990  Japan.

OTHER PUBLICATIONS

Prof. Rolf Hesch, "Membrane Press Systems A Critical Comparison With View to Heating Systems, Heat Distribution, Pressing Time and Costs," all pages.
Heinrich Wemhöner, "The Development of Membrane Press Technology," all pages.
FDM's Woodworking Technology 2000, "Unbeatable Doors at Any Price," Oct. 1993, all pages.

Primary Examiner—Michele K. Yoder
Attorney, Agent, or Firm—W. Thad Adams, III, P.A.

[57] ABSTRACT

A membrane press and method of elevating a three-dimensional workpiece are provided. The membrane press includes a work base having a supporting surface for carrying the workpiece. A foil-pressing frame is positioned above the workpiece for heating and applying a laminating foil to the workpiece. A plurality of fluid actuated pedestal assemblies are positioned for movement between a workpiece-loading position and a workpiece-lifting position above the supporting surface of the work base. Fluid passages communicate with the pedestal assemblies, and fluid pressure control means. The control means selectively directs a flow of fluid to the pedestal assemblies in response to the loading of the workpiece onto the supporting surface of the work base.

16 Claims, 5 Drawing Sheets

5,580,415

MEMBRANE PRESS WORK BASE

CROSS-REFERENCES TO RELATED APPLICATIONS

This application is a continuation-in-part of Ser. No. 08/229,976, filed Apr. 19, 1994, now U.S. Pat. No. 5,522,478.

TECHNICAL FIELD AND BACKGROUND OF THE INVENTION

This invention relates to a membrane press, work base, and method of elevating a three-dimensional workpiece carried by the work base. Membrane presses have been in existence since the early 1900's, and are used for applying a uniform, laminating exterior veneer to the top surface, corners, and peripheral borders of a relatively thin and flat, three-dimensional workpiece. The resulting laminated workpieces are typically used in furniture fronts, doors, cabinetry, desks, and other similar items where pleasing outward appearance and durability is desirable.

The pressing cycle of the present-day membrane press, using combined contact and convection heating, takes place in essentially four stages. The membrane press is first opened, and the laminating foil clamped along its respective edges to a tensioning frame positioned directly above the workpiece to be laminated. The tensioning frame includes a top heating platen and membrane located adjacent to and above the laminating foil. The membrane is sucked upwardly by a vacuum source to the top heating platen which acts to heat the membrane.

In a second stage, the membrane press is closed over the workpiece, and the membrane ventilated through exhaust passages. Hot air is circulated between the top heating platen and membrane to further heat the membrane. The foil is sucked upwardly into contact with the heated membrane by a second vacuum source to change the foil to its plastic state.

Thirdly, a third vacuum source is established under the heated foil to prevent air pockets from forming between the foil and exterior surface of the workpiece. The hot air circulated between the top heating platen and membrane is replaced by pressurized heated air to force the membrane and laminating foil downwardly onto the surface of the workpiece.

Finally, separation air is injected between the foil and membrane to lift and separate the membrane from the foil. After pressing, any excess foil overlapping the peripheral borders and corners of the laminated workpiece is removed by cutting. An additional surface finish or coating may then be applied to the workpiece to create a finished product ready for use in a furniture front, or similar article.

In order to properly and uniformly apply the laminating foil to the peripheral borders and corners of the workpiece, as described above, the workpiece must be slightly elevated above the supporting surface of the press table. According to prior art presses, a relatively thin particle board, often referred to as a dummy board, piggyback board, or raiser panel, is placed under the workpiece. These dummy boards limit the production of the press, since the corners of the boards often crumble during pressing. The crumbled particles then become positioned under the foil, which ultimately results in workpiece rejects as the particles show through the foil. Moreover, the dummy boards must be shaped and sized to fit the dimensions of each particular workpiece.

The present invention provides an alternative means for elevating the workpiece above the supporting surface of a work press, such as a membrane press. The present invention utilizes a fluid force acting beneath the workpiece and foil to elevate the workpiece. This results in increased production of the press, and reduces the number of workpiece rejects.

In addition, the invention in not limited to membrane presses, but instead has application to any work base where elevating a workpiece for processing is desirable. For example, the invention may be applicable to CNC routers, thermal-forming presses, deep-draw machines (vacuum presses), or any machine combining surface and edge processing in a single step.

SUMMARY OF THE INVENTION

Therefore, it is an object of the invention to provide a membrane press and work base which eliminates a need for dummy boards to elevate the workpiece above the supporting surface of the press table during pressing.

It is another object of the invention to provide a membrane press and work base including means operable for automatically elevating any given custom-sized, three-dimensional workpiece.

It is another object of the invention to provide a membrane press having increased production capability.

It is another object of the invention to provide a membrane press and work base which produces a reduced number of workpiece rejects.

It is another object of the invention to provide a membrane press and work base which includes workpiece elevating means automatically responsive to the placement of the workpiece onto the work base.

It is another object of the invention to provide a membrane press which utilizes a concentrated fluid source to elevate the workpiece during pressing.

It is another object of the invention to provide a workpiece elevating means for being incorporated into any work base not limited to membrane presses.

It is another object of the invention to provide a method of elevating a three-dimensional workpiece above the supporting surface of a work base automatically in response to loading of the workpiece onto the work base.

It is another object of the invention to provide a method of elevating a three-dimensional workpiece wherein a workpiece-lifting fluid is directed only to a surface area of the work base covered by the workpiece to provide a greater force for lifting and holding the workpiece in an elevated position.

It is another object of the invention to provide a method of elevating a three-dimensional workpiece wherein the workpiece remains level as it elevates above the supporting surface of the work base.

These and other objects of the present invention are achieved in the preferred embodiments disclosed below by providing a membrane press for applying a laminating foil to a three-dimensional workpiece to be laminated. The membrane press includes a work base having a supporting surface for carrying the workpiece, and a foil-pressing frame positioned above the workpiece for heating and applying a laminating foil to the workpiece.

A plurality of fluid actuated pedestal assemblies are positioned for movement between a workpiece-loading position and a workpiece-lifting position above the supporting surface of the work base. Elevating means fluidly communicates with the pedestal assemblies, and includes fluid pressure control means for selectively directing a flow of fluid to the pedestal assemblies.

Thus, upon loading of the workpiece onto the supporting surface of the work base, the control means opens fluid flow only to those pedestal assemblies covered by the workpiece to lift the pedestal assemblies and the workpiece supported thereon upwardly into the workpiece-lifting position. Upon removing the workpiece from the supporting surface of the work base, the control means closes fluid flow to the pedestal assemblies and the pedestal assemblies return to the workpiece-loading position.

According to one preferred embodiment of the invention, the control means includes a control piston for being automatically actuated in response to loading of the workpiece onto the supporting surface of the work base. The control piston is actuated from a closed position causing blockage of fluid flow to the pedestal assembly to an open position causing release of fluid flow to the pedestal assembly.

According to another preferred embodiment of the invention, the pedestal assembly includes a main piston located beneath the supporting surface of the work base. The main piston cooperates with the control piston in its open position to lift those pedestal assemblies covered by the workpiece and the workpiece supported thereon upwardly into the workpiece-lifting position.

According to yet another preferred embodiment of the invention, a first fluid passage communicates with the control piston and has an inlet located at the supporting surface of the work base. The first fluid passage is fluidly connected to a source of negative fluid flow to draw air inwardly from above the supporting surface of the work base. The inwardly drawn air normally urges the control piston into its closed position.

According to yet another preferred embodiment of the invention, a second fluid passage is fluidly connected to a source of positive fluid flow and has an outlet communicating with the main piston. The main piston resides in sealing engagement with the outlet when the control piston is in its closed position. This blocks fluid flow to the main piston, and maintains the pedestal assembly in its workpiece-loading position.

According to yet another preferred embodiment of the invention, a third fluid passage is formed upon movement of the control piston to its open position. The third fluid passage communicates with the first fluid passage and a rod side of the main piston. The third fluid passage cooperates with the source of negative fluid flow to create a suction force on the rod side of the main piston sufficient to lift the main piston out of sealing engagement with the outlet of the second fluid passage. Thus, fluid flow is released to a blind side of the main piston to elevate the pedestal assembly upwardly into its workpiece-lifting position.

According to yet another preferred embodiment of the invention, exhaust means is provided for exhausting fluid as the pedestal assembly returns from the workpiece-lifting position to the workpiece-loading position.

Preferably, the exhaust means includes a one-way valve.

A work base defines a supporting surface for carrying a three-dimensional workpiece to be elevated. The work base includes a plurality of fluid actuated-pedestal assemblies positioned for movement between a workpiece-loading position and a workpiece-lifting position above the supporting surface of the work base. Elevating means fluidly communicates with the pedestal assemblies, and includes fluid pressure control means for selectively directing a flow of fluid to the pedestal assemblies. Thus, upon loading of the workpiece onto the supporting surface of the work base, the control means opens fluid flow only to those pedestal assemblies covered by the workpiece to lift the pedestal assemblies and the workpiece supported thereon upwardly into the workpiece-lifting position. Upon removing the workpiece from the supporting surface of the work base, the control means closes fluid flow to the pedestal assemblies and the pedestal assemblies return to the workpiece-loading position.

An embodiment of the method according to the invention includes the steps of locating a plurality of fluid actuated pedestal assemblies within a work base for movement between a workpiece-loading position and a workpiece-lifting position above the supporting surface of the work base. Then loading the workpiece to be elevated onto the supporting surface of the work base to cover at least one of the plurality of pedestal assemblies. Then opening a fluid flow only to those pedestal assemblies covered by the workpiece. Then elevating those pedestal assemblies covered by the workpiece and the workpiece supported thereon upwardly into the workpiece-lifting position.

According to another preferred embodiment of the invention, the step of opening fluid flow includes the step of actuating fluid pressure control means in response to the loading of the workpiece onto the supporting surface of the work base for selectively directing fluid flow only to those pedestal assemblies covered by the workpiece.

According to yet another preferred embodiment of the invention, the step of actuating control means includes the step of pneumatically lifting a control piston located adjacent to a main piston of the pedestal assembly upwardly from a recessed position slightly beneath the supporting surface of the work base to a raised position generally flush with the plane of the supporting surface.

According to yet another preferred embodiment of the invention, the method includes the step of automatically lifting the main piston of the pedestal assembly slightly upwardly in response to the movement of the control piston into the raised position to open a fluid flow passage to the main piston.

According to yet another preferred embodiment of the invention, the step of elevating the pedestal assemblies includes the step of directing a positive fluid flow through the fluid flow passage to the main pistons of those pedestal assemblies covered by the workpiece to urge the pedestal assemblies upwardly into the workpiece-lifting position.

According to yet another preferred embodiment of the invention, the method includes the step of exhausting the fluid flow for elevating the pedestal assemblies into the workpiece-lifting position as the pedestal assemblies return to the workpiece-loading position.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
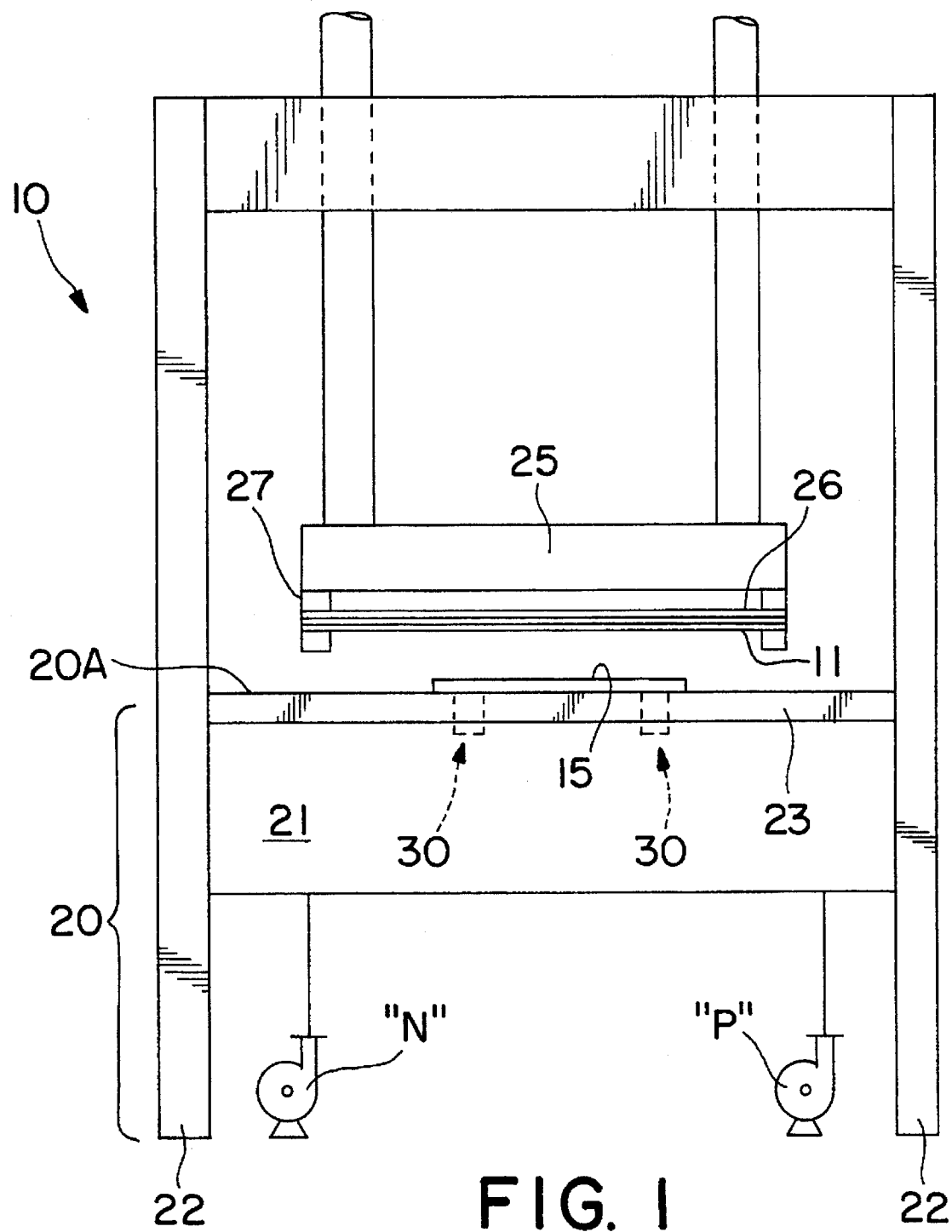
FIG. 1 is a simplified, elevational view of a membrane press according to one preferred embodiment of the invention, and showing a workpiece positioned on a work base prior to lamination.

Referring now specifically to the drawings, a membrane press according to the present invention is illustrated in FIG. 1 and shown generally at reference numeral 10. The membrane press 10 is used for applying a laminating foil 11, made from a thermoplastic material such as polyolefin, to the exterior surface of a workpiece 15 to be laminated. In the embodiment disclosed, the workpiece 15 is a wood-based, profiled MFD board. Such boards are typically used as furniture fronts for cabinetry, countertops, kitchen tables, and the like.

Figure 2:
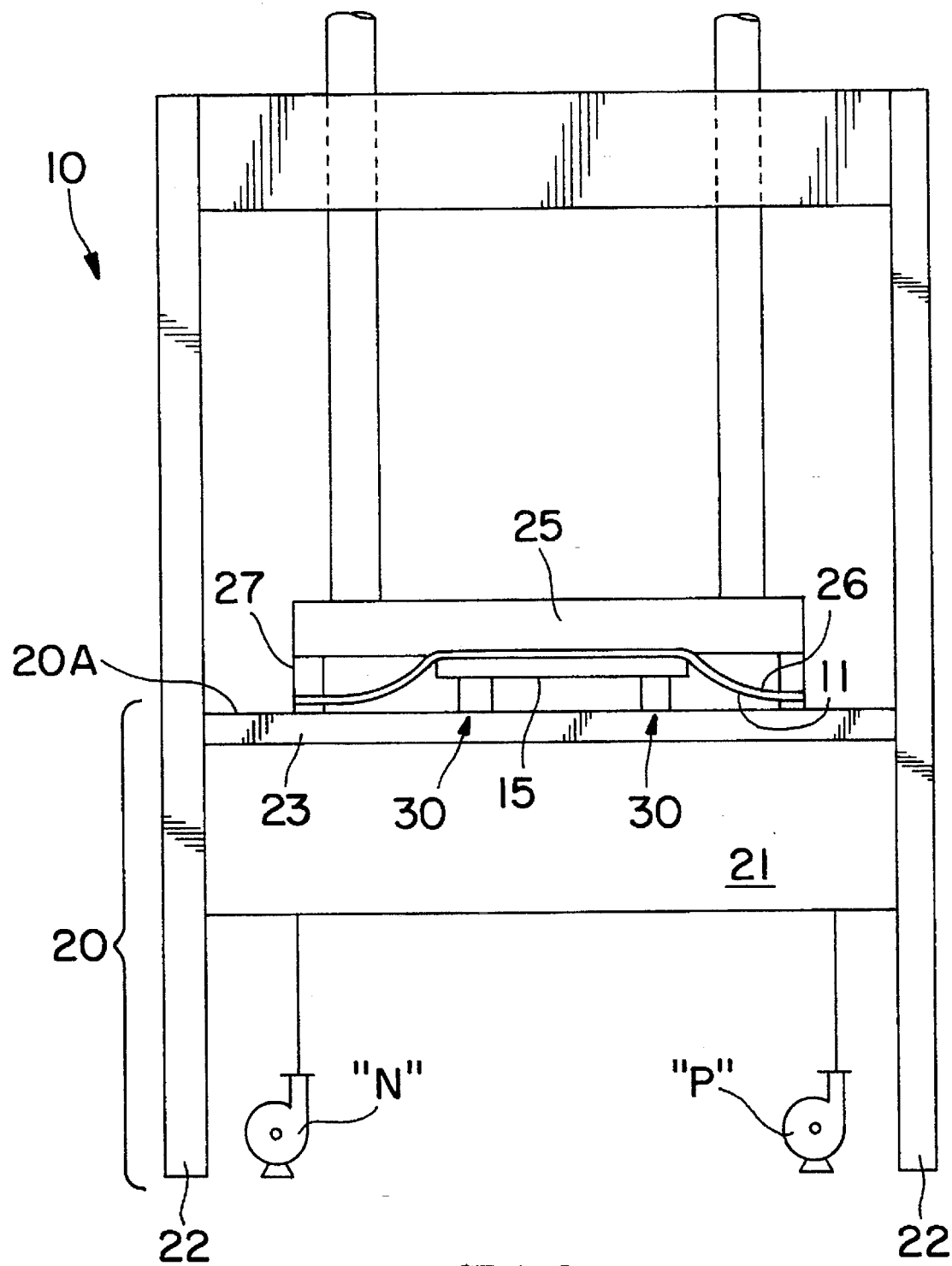
FIG. 2 is an elevational view of the membrane press in a lowered position, and during lamination of the elevated workpiece.
Figure 3:
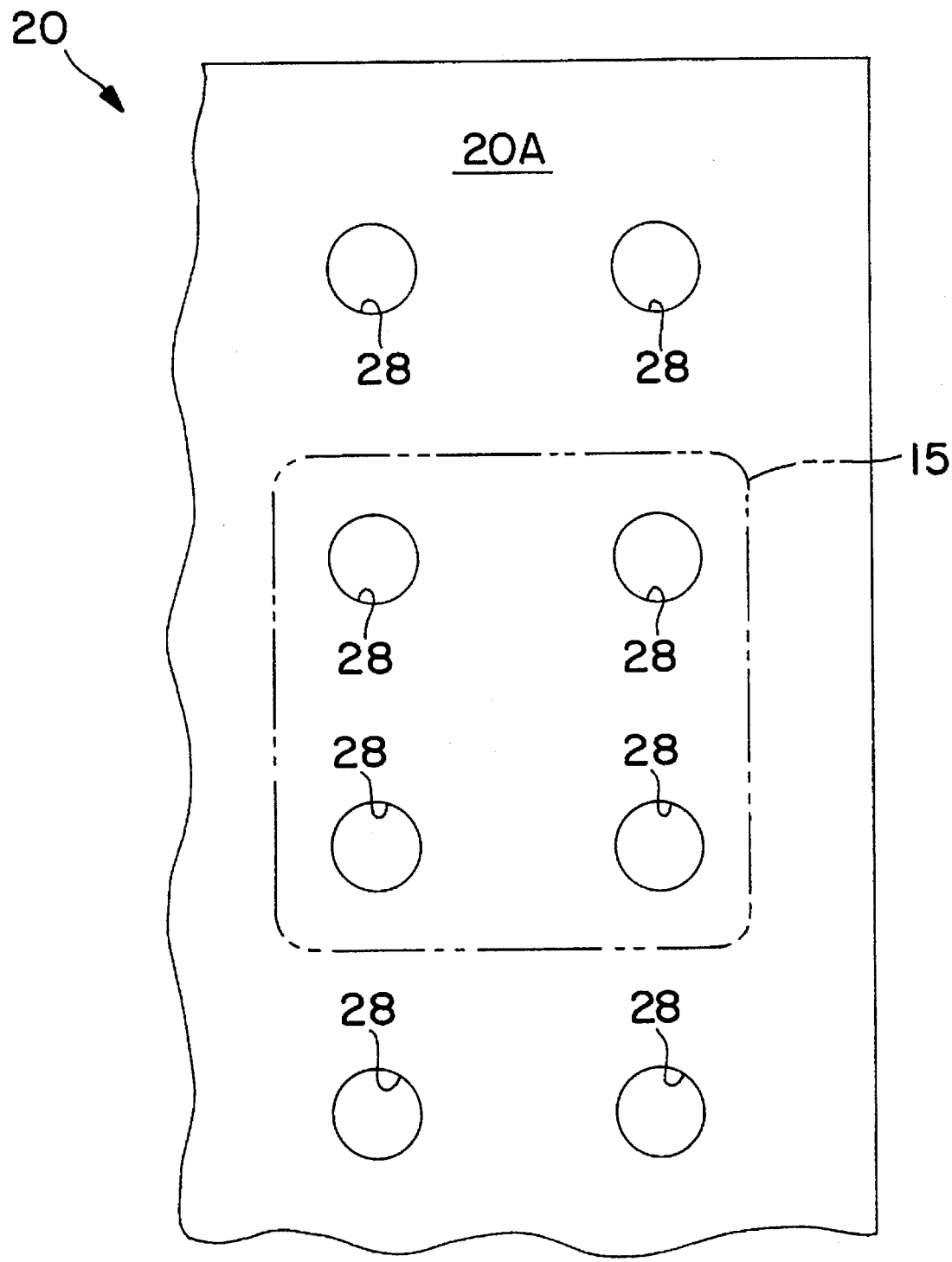
FIG. 3 is a fragmentary top plan view of the work base, and showing the workpiece in phantom.

As shown in FIGS. 1 and 2, the membrane press 10 includes a work base 20 for supporting the workpiece 15 to be laminated. The work base 20 is constructed generally of a bottom press table 21 supported by legs 22, and preferably includes a bottom heating platen 23.

A top heating platen 25, membrane 26, and foil-pressing frame 27 are positioned above the workpiece 15 for heating the laminating foil 11, and applying the laminating foil 11 to the workpiece 15, as shown in FIG. 2. The membrane press 10 may utilize any desired foil-pressing frame 27 known in the art, such as a Vario-frame or multi-purpose frame. In addition, the membrane press 10 is not limited to a particular class of presses. For example, the membrane press 10 may be one which is preferably operated without a membrane 26, or one which is preferably operated with a membrane 26, or one which must include a membrane 26.

Membrane pressing occurs by first clamping the edges of the laminating foil 11 into the foil-pressing frame 27 in a tensioned condition, heating the foil 11 by operation of the top heating platen 25 and membrane 26, and then lowering the foil-pressing frame 27 onto the supporting surface 20A of the work base 20 to apply the foil 11 to the workpiece 15. To enable complete and uniform coverage of foil 11 onto the workpiece 15 including the peripheral borders and corners of the workpiece 15, the workpiece 15 must be slightly elevated above the supporting surface 20A of the work base 20.

As previously described, one prior art means of elevating the workpiece 15 includes the use of a dummy board. The present membrane press 10 eliminates the need for such boards by providing fluid-actuated elevating means responsive to the loading of the workpiece 15 onto the supporting surface 20A of the work base 20 to elevate the workpiece 15 above the supporting surface 20A for lamination. The fluid of the elevating means is preferably air, although other fluids such as a gas or water may be employed. The elevating means is described in detail below.

ELEVATING AND WORKPIECE

As best shown in FIGS. 3–7, the work base 20 includes a plurality of top surface openings 28, and cylinders 29 for housing respective pedestal assemblies 30. The pedestal assemblies 30 are positioned for fluid-induced movement within the cylinders 29 between a workpiece-loading position (See FIG. 1) generally flush with the supporting surface 20A of the work base 20, and a workpiece-lifting position (See FIG. 2) slightly above the supporting surface 20A of the work base 20.

Each pedestal assembly 30 preferably includes a main piston 31 which cooperates with a source "P" of positive air flow to induce upward movement of the pedestal assembly 30 in response to the loading of the workpiece 15 onto the supporting surface 20A of the work base 20. A fluid pressure control piston 32 is located adjacent to the main piston 31, and serves to selectively direct the positive air flow only to those pedestal assemblies 30 covered by the workpiece 15 to lift the pedestal assemblies 30 and the workpiece 15 upwardly into the workpiece-lifting position. Thus, because the positive air flow is directed only to certain ones of the pedestal assemblies 30 of the work base 20, a greater force is available for lifting the pedestal assemblies 30 upwardly into the workpiece-lifting position and for holding the pedestal assemblies 30 in this position during lamination of the workpiece 15.

Figure 4:
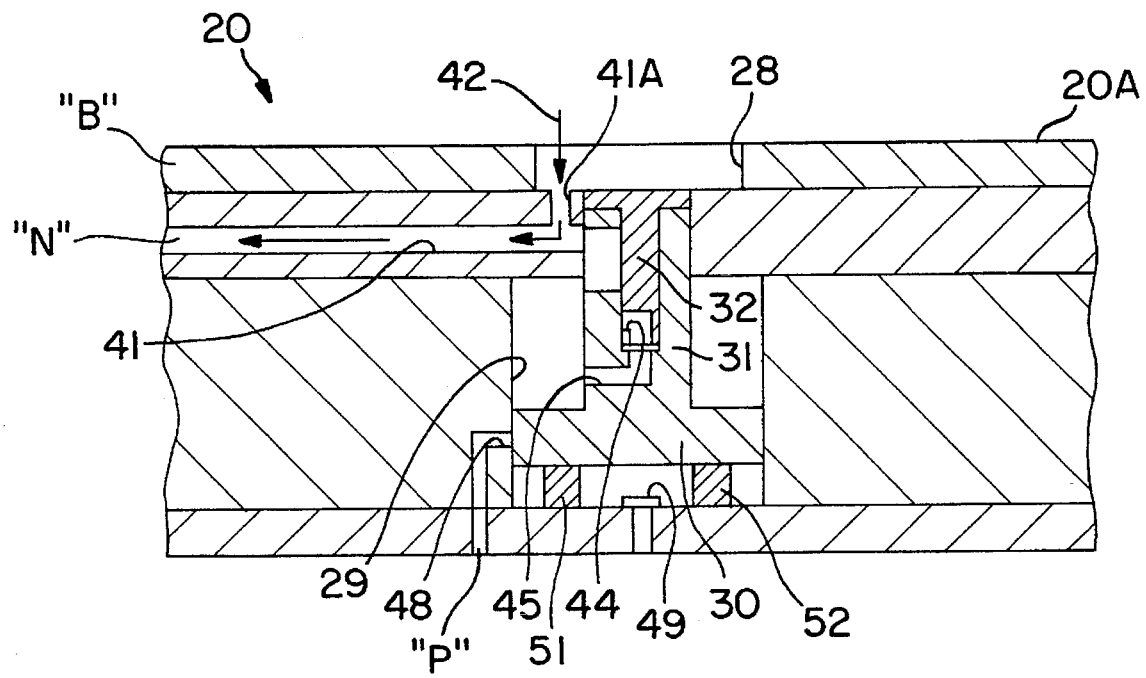
FIG. 4 is a fragmentary cross-sectional view of the work base prior to loading the workpiece onto the supporting surface of the work base, and showing the control piston in its closed position.

FIG. 4 illustrates the state of the control piston 32 and main piston 31 prior to loading the workpiece 15 onto the work base 20. As shown, the control piston 32 communicates with a fluid flow passage 41 having an inlet 41A located at the top surface opening 28 of the work base 20. The passage 41 is connected to a source "N" of negative air flow which operates to draw air inwardly from above the supporting surface 20A of the work base 20 as indicated by the direction arrow 42. The control piston 32 is urged downwardly into a closed position.

Figure 5:
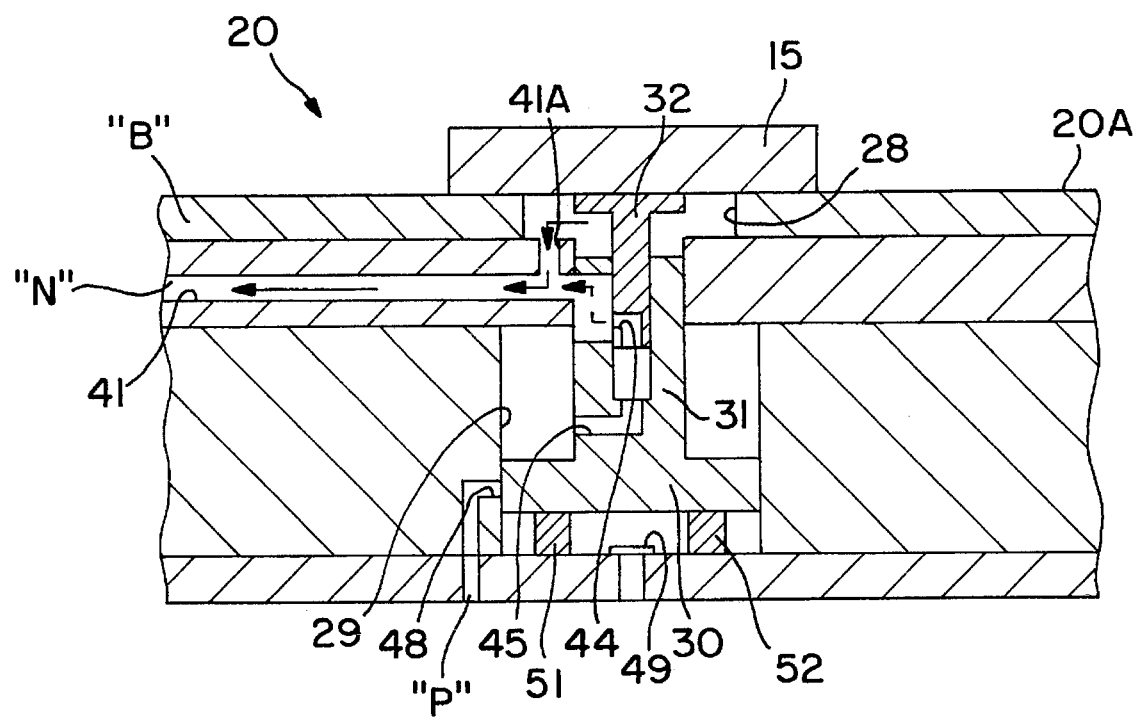
FIG. 5 is a fragmentary cross-sectional view of the work base immediately after loading the workpiece onto the supporting surface of the work base, and showing the control piston in its open position.

As shown in FIG. 5, immediately after the workpiece 15 is loaded onto the work base 20 and moved into proper position by press belts "B" to cover the opening 28, negative air flow from above the supporting surface 20A is blocked. This creates a vacuum force on a rod side of the control piston 32 which causes slight upward movement of the control piston 32 from its closed position to an open position directly beneath the workpiece 15 and generally flush with the supporting surface 20A of the work base 20.

Figure 6:
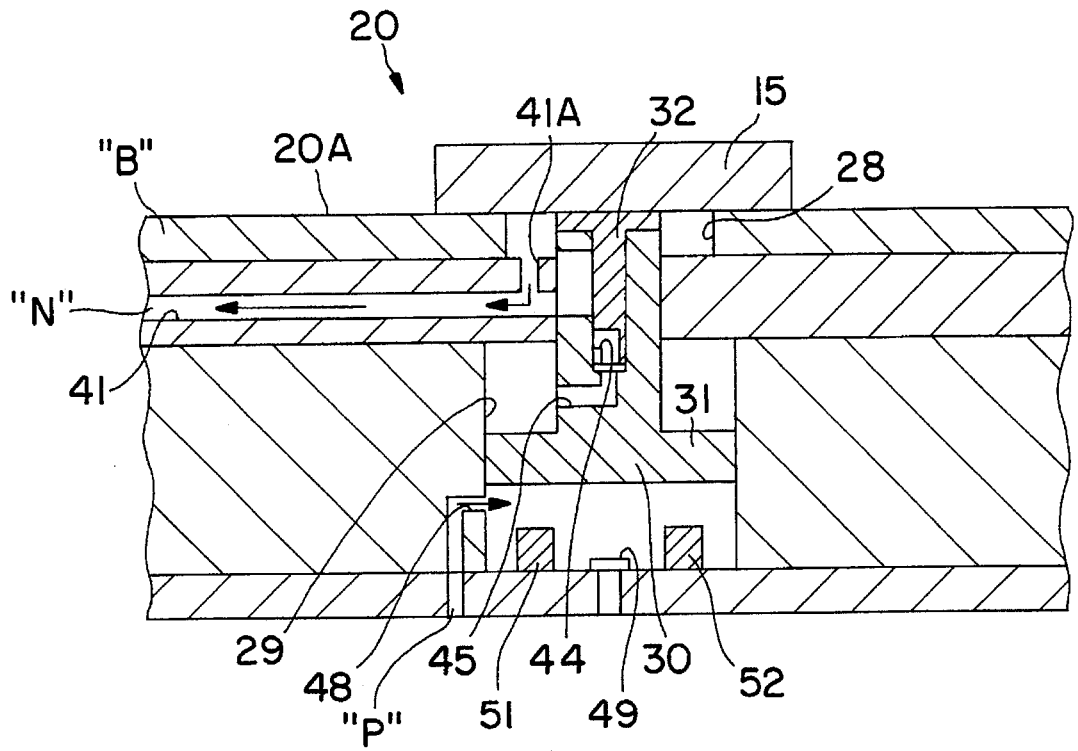
FIG. 6 is a fragmentary cross-sectional view of the work base after loading the workpiece onto the supporting surface of the work base, and showing the main piston in a slightly raised position opening a fluid flow passage to a blind side of the main piston.

An opening 44 formed in a bottom end of the control piston 32 moves into registration with the passage 41 to open a normally closed second passage 45 communicating with a rod side of the main piston 31. The negative air flow draws air through the second passage 45, and creates a vacuum force acting on the rod side of the main piston 31. The force is sufficient to lift the main piston 31 slightly upwardly to a position directly adjacent a top end of the control piston 32, as shown in FIG. 6.

Figure 7:
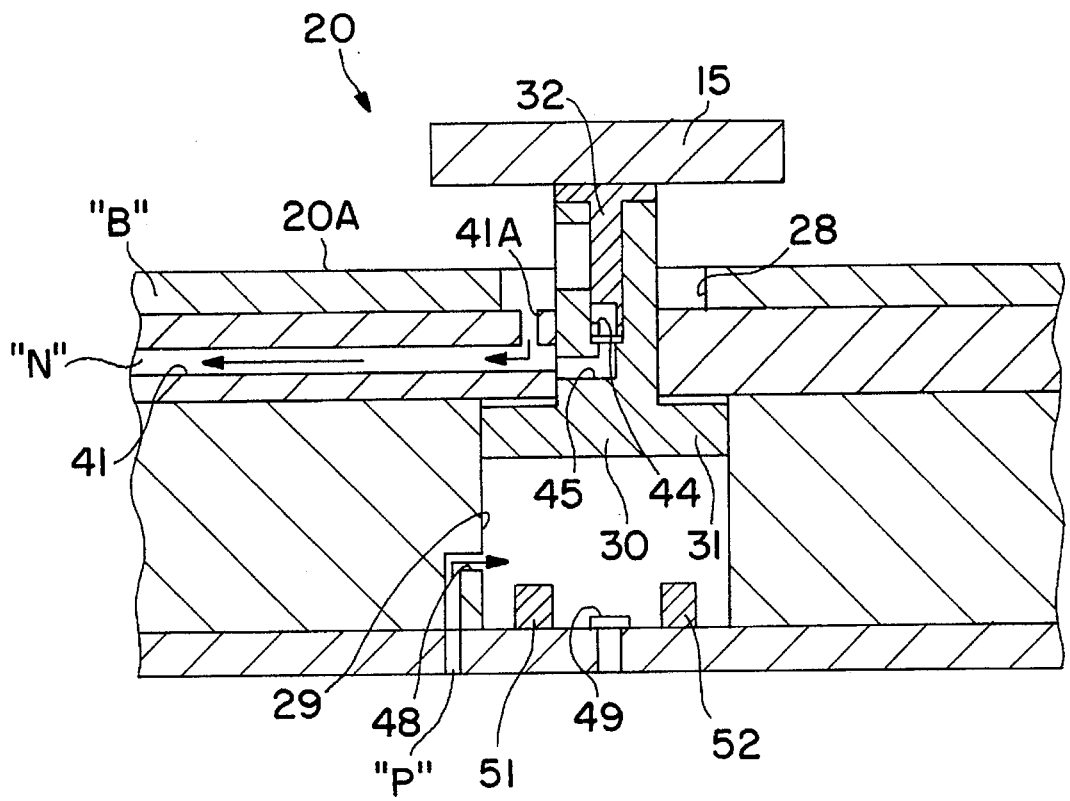
FIG. 7 is a fragmentary cross-sectional view of the work base after loading the workpiece onto the supporting surface of the work base, and showing the pedestal assembly and workpiece lifted into the workpiece-lifting position.

When moved to this position, the main piston 31 opens an otherwise blocked third fluid flow passage 48. The passage 48 is connected to the source "P" of positive air flow, and when opened, directs the positive air flow to a blind side of the main piston 31. The resulting positive force urges the main piston 31 upwardly to lift the pedestal assembly 30 into its workpiece-lifting position, as shown in FIG. 7. Thus, all of the pedestal assemblies 30 covered by the workpiece 15 are raised evenly to sufficiently elevated the workpiece 15 for laminating, as described above, or any other desired processing.

When the workpiece 15 is removed from the work base 20, the source "P" of positive air flow is shut off, either manually or by computer control means. A negative air flow may be introduced into the passage 48. This causes the pedestal assembly 30 to return to its workpiece-loading position shown in FIG. 4. Air contained in the cylinder 29 is preferably exhausted through a one-way exhaust flow valve 49 located beneath the main piston 31. Stoppers 51 and 52 stop the downward movement of the main piston 31, and serve to properly re-align the main piston 31 in sealing relation to the outlet of the passage 48. In addition, the main piston 31 may include air sealing O-rings (not shown) to prevent the escape of positive air pressure from the cylinder 29, and to further seal the outlet of the passage 48.

In one embodiment, the negative air pressure generated by the negative air flow source "N" is approximately two bars. The positive air pressure generated by the positive air flow source "P" is approximately six bars. Either one or both of these air sources may be activated either manually or by computer control means. In addition, the positive and negative air flow to the work base 20 may be constant, or selectively triggered by the user.

Application of the workpiece elevating means described above in connection with the membrane press is not limited to membrane presses. Rather, the elevating means may be applied to any work base structure having a supporting surface for carrying a workpiece to be elevated. For example, the workpiece elevating means and method may be incorporated for use in CNC routers, thermal-forming presses, deep-draw machines (vacuum presses), or any machine combining surface and edge processing in a single step.

A membrane press, a work base, and method of elevating a three-dimensional workpiece are described above. Various details of the invention may be changed without departing from its scope. Furthermore, the foregoing description of the preferred embodiment of the invention is provided for the purpose of illustration only and not for the purpose of limitation—the invention being defined by the claims.

I claim:

1. In a membrane press for applying a laminating foil to a three-dimensional workpiece to be laminated, the membrane press including a work base having a substantially flat supporting surface for carrying the workpiece, and a foil-pressing frame positioned above the workpiece for heating and applying a laminating foil to the workpiece, the improvement in said membrane press comprising:

(a) a plurality of fluid actuated pedestal assemblies fluidly responsive to the placement of the workpiece onto the supporting surface of the work base, and positioned for movement between a workpiece-loading position recessed within the work base and a workpiece-lifting position extending above the supporting surface of the work base;

(b) elevating means fluidly communicating with said pedestal assemblies, and comprising fluid pressure control means for selectively directing a flow of fluid to said pedestal assemblies, such that:

(1) upon loading of the workpiece onto the supporting surface of the work base, said control means opens fluid flow only to those of said pedestal assemblies covered by said workpiece to lift those of said pedestal assemblies and the workpiece supported thereon upwardly from the workpiece-loading position to the workpiece-lifting position; and (2) upon removing the workpiece from the supporting surface of the work base, said control means closes fluid flow to said pedestal assemblies and said pedestal assemblies return to the workpiece-loading position.

2. A membrane press according to claim 1, wherein said control means comprises a control piston for being automatically actuated in response to loading of the workpiece onto the supporting surface of the work base from a closed position causing blockage of fluid flow to said pedestal assembly to an open position causing release of fluid flow to said pedestal assembly.

3. A membrane press according to claim 2, wherein said pedestal assembly comprises a main piston located beneath the supporting surface of the work base, and cooperating with the control piston in its open position to lift those of said pedestal assemblies covered by the workpiece and the workpiece supported thereon upwardly into the workpiece-lifting position.

4. A membrane press according to claim 3, and including a first fluid passage communicating with said control piston and having an inlet located at the supporting surface of the work base, said first fluid passage being fluidly connected to a source of negative fluid flow to draw air inwardly from above the supporting surface of the work base and to normally urge said control piston into its closed position.

5. A membrane press according to claim 4, and including a second fluid passage fluidly connected to a source of positive fluid flow and having an outlet communicating with said main piston, and said main piston residing in sealing engagement with the outlet when said control piston is in its closed position, thereby blocking fluid flow to the main piston and maintaining the pedestal assembly in its workpiece-loading position.

6. A membrane press according to claim 5, and including a third fluid passage formed upon movement of said control piston to its open position, said third fluid passage communicating with the first fluid passage and a rod side of said main piston, and cooperating with the source of negative fluid flow to create a suction force on the rod side of said main piston sufficient to lift said main piston out of sealing engagement with the outlet of the second fluid passage, thereby releasing fluid flow to a blind side of said main piston and elevating said pedestal assembly upwardly into its workpiece-lifting position.

7. A membrane press according to claim 1, and including exhaust means for exhausting fluid as said pedestal assembly returns from the workpiece-lifting position to the workpiece-loading position.

8. A membrane press according to claim 7, wherein said exhaust means comprises a one-way valve.

9. A work base defining a substantially flat supporting surface for carrying a three-dimensional workpiece to be elevated, said work base comprising:

(a) a plurality of fluid actuated pedestal assemblies fluidly responsive to the placement of the workpiece onto the supporting surface of the work base, and positioned for movement between a workpiece-loading position recessed within the work base and a workpiece-lifting position extending above the supporting surface of the work base;

(b) elevating means fluidly communicating with said pedestal assemblies, and comprising fluid pressure control means for selectively directing a flow of fluid to said pedestal assemblies, such that:

(1) upon loading of the workpiece onto the supporting surface of the work base, said control means opens fluid flow only to those of said pedestal assemblies covered by said workpiece to lift those of said pedestal assemblies and the workpiece supported thereon upwardly from the workpiece-loading position to the workpiece-lifting position; and (2) upon removing the workpiece from the supporting surface of the work base, said control means closes fluid flow to said pedestal assemblies and said pedestal assemblies return to the workpiece-loading position.

10. A work base according to claim 9, wherein said control means comprises a control piston for being automatically actuated in response to loading of the workpiece onto the supporting surface of the work base from a closed position causing blockage of fluid flow to said pedestal assembly to an open position causing release of fluid flow to said pedestal assembly.

11. A work base according to claim 10, wherein said pedestal assembly comprises a main piston located beneath the supporting surface of the work base, and cooperating with the control piston in its open position to lift those of said pedestal assemblies covered by the workpiece and the workpiece supported thereon upwardly into the workpiece-lifting position.

12. A work base according to claim 11, and including a first fluid passage communicating with said control piston and having an inlet located at the supporting surface of the work base, said first fluid passage being fluidly connected to a source of negative fluid flow to draw air inwardly from above the supporting surface of the work base and to normally urge said control piston into its closed position.

13. A work base according to claim 12, and including a second fluid passage fluidly connected to a source of positive fluid flow and having an outlet communicating with said main piston, and said main piston residing in sealing engagement with the outlet when said control piston is in its closed position, thereby blocking fluid flow to the main piston and maintaining the pedestal assembly in its workpiece-loading position.

14. A work base according to claim 13, and including a third fluid passage formed upon movement of said control piston to its open position, said third fluid passage communicating with the first fluid passage and a rod side of said main piston, and cooperating with the source of negative fluid flow to create a suction force on the rod side of said main piston sufficient to lift said main piston out of sealing engagement with the outlet of the second fluid passage, thereby releasing fluid flow to a blind side of said main piston and elevating said pedestal assembly upwardly into its workpiece-lifting position.

15. A work base according to claim 9, and including exhaust means for exhausting fluid as said pedestal assembly returns from the workpiece-lifting position to the workpiece-loading position.

16. A work base according to claim 15, wherein said exhaust means comprises a one-way valve.

* * * * *